United States Patent
Hsu et al.

(10) Patent No.: US 12,455,400 B2
(45) Date of Patent: Oct. 28, 2025

(54) ULTRA-COMPACT MULTILAYER METASURFACE IMAGING SYSTEM INTEGRATING LENSES AND SPACES

(71) Applicant: UNIVERSITY OF SOUTHERN CALIFORNIA, Los Angeles, CA (US)

(72) Inventors: Chia Wei Hsu, Los Angeles, CA (US); Shiyu Li, Los Angeles, CA (US); Mahsa Torfeh, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 496 days.

(21) Appl. No.: 17/944,959

(22) Filed: Sep. 14, 2022

(65) Prior Publication Data

US 2023/0081415 A1   Mar. 16, 2023

Related U.S. Application Data

(60) Provisional application No. 63/243,914, filed on Sep. 14, 2021.

(51) Int. Cl.
*G02B 1/00* (2006.01)
*H04N 25/71* (2023.01)

(52) U.S. Cl.
CPC ............ *G02B 1/002* (2013.01); *H04N 25/71* (2023.01)

(58) Field of Classification Search
CPC ........... G02B 1/00; G02B 1/002; H04N 25/71

USPC .......................................................... 359/811
See application file for complete search history.

(56) References Cited

U.S. PATENT DOCUMENTS

| | | | |
|---|---|---|---|
| 9,946,051 B2* | 4/2018 | Han | G02B 9/14 |
| 11,747,524 B2* | 9/2023 | Park | G02B 5/1814 |
| | | | 359/652 |
| 11,988,844 B2* | 5/2024 | Riley, Jr. | G02B 27/1006 |
| 2020/0225386 A1* | 7/2020 | Tsai | G02B 1/002 |
| 2020/0284960 A1* | 9/2020 | Ellenbogen | G02B 5/20 |
| 2021/0044748 A1* | 2/2021 | Hu | G02B 27/0172 |
| 2021/0337140 A1* | 10/2021 | Siddique | G02B 13/146 |
| 2022/0082794 A1* | 3/2022 | Kim | G02B 13/003 |
| 2022/0091428 A1* | 3/2022 | Riley, Jr. | G02B 6/24 |

* cited by examiner

*Primary Examiner* — William R Alexander
(74) *Attorney, Agent, or Firm* — Snell & Wilmer LLP

(57) ABSTRACT

A lens system having reduced physical size. The lens system includes multiple metalenses, lenses with metasurfaces, that integrate the lens and the free space and compress them into multiple layers of metasurfaces, significantly reducing the overall volume and weight of the imaging system while increasing its efficiency. The lens system also provides for tools that can accurately model 3D multilayer metasurfaces, carry out inverse design to find the optimal and fault-tolerant structure, fabricate the metasurfaces with multi-project wafer service, assemble them with a 3D-printed holder, and characterize the performance of the resulting ultra-compact imaging system.

17 Claims, 11 Drawing Sheets

ULTRA-COMPACT MULTILAYER METASURFACE IMAGING SYSTEM INTEGRATING LENSES AND SPACES

CROSS-REFERENCE TO RELATED APPLICATIONS

This application is based upon and claims priority to U.S. provisional patent application 63/243,914 entitled "ULTRA-COMPACT MULTILAYER METASURFACE IMAGING SYSTEM INTEGRATING LENSES AND SPACES" and filed on Sep. 14, 2021, the entire content of which is incorporated herein by reference.

BACKGROUND

1. Field

This disclosure relates generally to lenses, and more specifically, to metasurface lenses.

2. Description of the Related Art

Augmented reality (AR) and mixed reality (MR) have attracted significant attention in recent years for their potential to create immersive, three-dimensional, and interactive visual experiences. Such technology can elevate the interface between humans and computers from 2D screens and keyboards to 3D volumetric interactions, enabling a wide range of applications in industrial design, architecture, medical surgeries, remote work and collaboration, education, arts, gaming, data visualization, space explorations, and beyond. To achieve large-scale adoption, one must reduce the weight and size of the AR/MR devices while improving their capabilities and bringing down their cost. The original smartphone would not have led to a smartphone revolution if it was too heavy or too bulky to hold comfortably with one hand. Meanwhile, current AR/MR headsets are bulky and heavy, making them inconvenient to carry and uncomfortable to wear for extended periods.

Optical components are the engine of AR/MR devices and also contribute significantly to their weight and volume. For example, the Microsoft Hololens 2 uses 8 cameras: 4 for head tracking, 2 for eye tracking, 1 for depth sensing, and 1 RGB camera for capturing what the wearer sees. The holographic display module also consists of bulky optical elements. Reducing the weight and form factor of these optical components is crucial for pushing AR/MR devices toward broader adoption. However, the size and weight reduction cannot sacrifice the performance, as high-resolution imaging with sufficient field of view (FOV) is crucial for a functional and immersive AR/MR system.

SUMMARY

A lens system is disclosed. The lens system may include a first metasurface spaced a first distance from an aperture. The lens system may include a second metasurface spaced a second distance from the first metasurface. The first metasurface is between the aperture and the second metasurface. The lens system may include a sensing device spaced a third distance from the second metasurface. The first metasurface and the second metasurface are between the aperture and the sensing device.

The system may include one or more other aspect as well. For instance, the sensing device may be a CCD array. The aperture may be an aperture of a camera. The first metasurface and the second metasurface may be metasurfaces of a metasurface array containing additional metasurfaces disposed between the aperture and the sensing device in spaced apart relation. A third metasurface and a fourth metasurface may be disposed between the aperture and the sensing device in spaced apart relation. The sensing device may be located to maximize an intensity of incident planewave light for all incident angles of light entering the aperture. The positions of the sensing device and metasurfaces can be adjusted for a better imaging performance.

The first and/or second metasurface may be silicon nitride (SiN). The first and/or second metasurface may have a silica substrate and the silicon nitride may be on the silica substrate. The SiN may be a layer that is at least 800 nm thick. The SiN may be patterned with 200 nm minimal feature size and 300 nm minimal separation. A metasurface holder may be located between the aperture and sensing device and holding the first metasurface and the second metasurface in fixed spatial orientation.

A method of manufacturing a lens system is provided. The method may include providing a first metasurface spaced a first distance from an aperture. The method may include providing a second metasurface spaced a second distance from the first metasurface. The first metasurface may be between the aperture and the second metasurface. The method may include providing a sensing device spaced a third distance from the second metasurface. The first metasurface and the second metasurface may be between the aperture and the sensing device.

The method may include one or more other aspects. For instance, the sensing device may be a CCD array. The aperture may be an aperture of a camera. The first metasurface and the second metasurface may be metasurfaces of a metasurface array and the method may include providing additional metasurfaces disposed between the aperture and the sensing device in spaced apart relation. The method may include providing a third metasurface and a fourth metasurface disposed between the aperture and the sensing device in spaced apart relation. The method may include locating the sensing device to maximize an intensity of incident planewave light for all incident angles of light entering the aperture. The positions of the sensing device and metasurfaces can be adjusted for a better imaging performance. Providing the first metasurface and/or the second metasurface may include forming a layer of silicon nitride on a silica substrate. The method may include providing metasurface holder located between the aperture and sensing device and holding the first metasurface and the second metasurface in fixed spatial orientation.

A lens system is disclosed. The lens system may include a metasurface array having a plurality of spaced apart metasurfaces. The lens system may include a metasurface holder supporting each metasurface of the plurality of metasurfaces in fixed spaced apart relation. The lens system may include a sensing device spaced away from the metasurface array to receive light from at least one of the plurality of spaced apart metasurfaces. The sensing device may be oriented relative to the metasurface array to maximize an intensity of the light emitted in response to incident light for a plurality of incident angles of incident light entering the metasurface array.

BRIEF DESCRIPTION OF THE DRAWINGS

Other systems, methods, features, and advantages of the present invention will be or will become apparent to one of ordinary skill in the art upon examination of the following figures and detailed description.

DETAILED DESCRIPTION

Figure 1A:
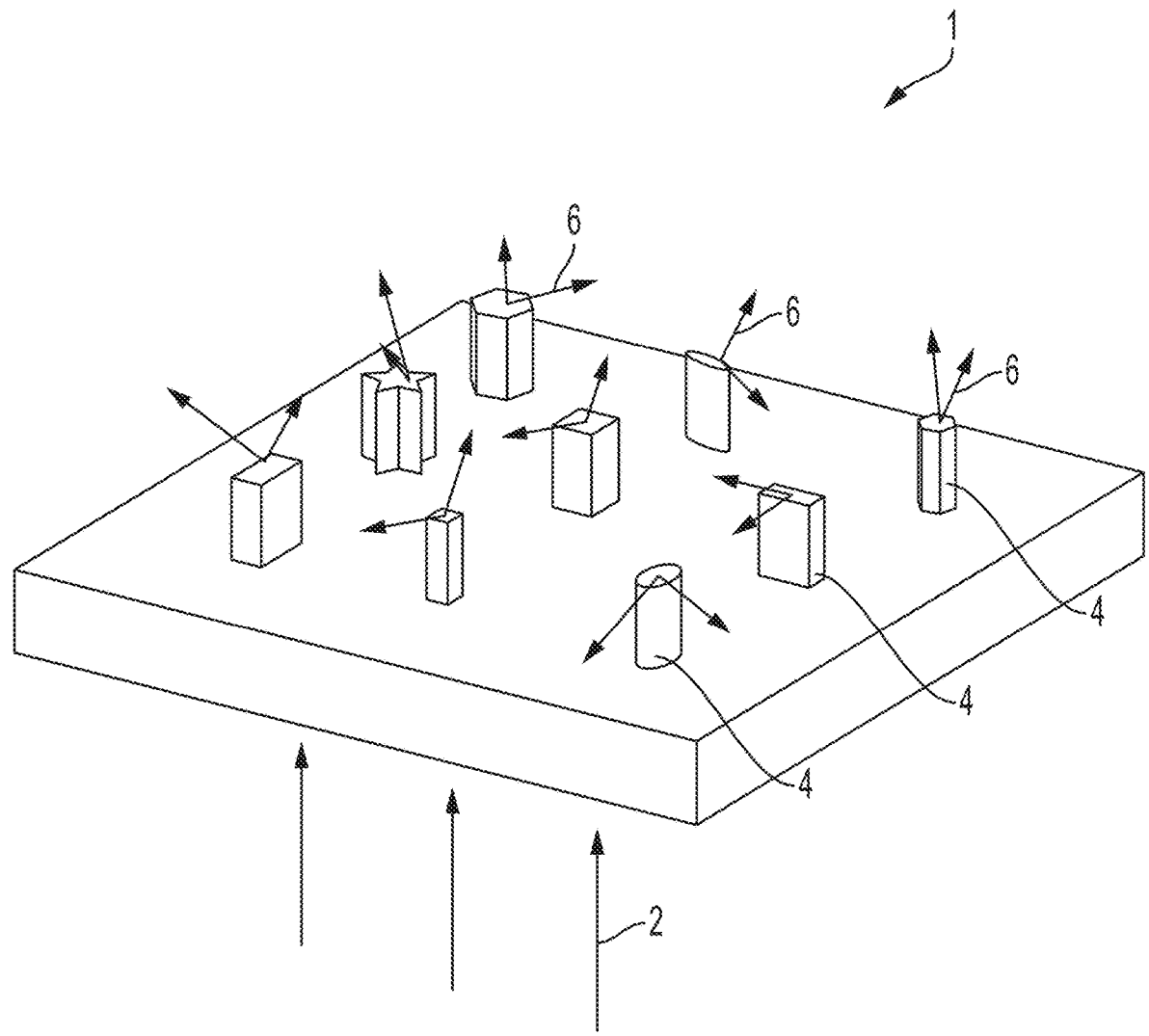
FIG. 1A illustrates a metasurface and incident light scattered by nanostructures of the metasurface, in accordance with various embodiments.

Augmented reality (AR) adds a new dimension to the interface between humans and computers, providing 3D and immersive interactions while opening up numerous application areas. AR headsets such as the Hololens are now available for early adapters. However, current AR headsets suffer from heavy weight and bulky size, making them inconvenient to carry and uncomfortable to wear. AR headsets require many cameras, which contribute as a main source of the weight and size. This disclosure proposes to design and develop a new imaging system using multilayer metasurfaces that drastically reduce the weight and volume of these cameras. While some embodiments of metalenses (lenses made with metasurfaces) reduce the footprint of the lens but not of the free space that takes up most of the volume in an imaging system, other embodiments also integrate the lens and the free space and compress them into multiple layers of metasurfaces, significantly reducing the overall volume and weight of the imaging system while increasing its efficiency. This disclosure also provides tools that can accurately model 3D multilayer metasurfaces, carry out inverse design to find the optimal and fault-tolerant structure, fabricate the metasurfaces with multi-project wafer service, assemble them with a 3D-printed holder, and characterize the performance of the resulting ultra-compact imaging system.

Augmented reality (AR) and mixed reality (MR) have attracted significant attention in recent years for their potential to create immersive, three-dimensional, and interactive visual experiences. Such technology can elevate the interface between humans and computers from 2D screens and keyboards to 3D volumetric interactions, enabling a wide range of applications in industrial design, architecture, medical surgeries, remote work and collaboration, education, arts, gaming, data visualization, space explorations, and beyond. To achieve large-scale adoption, one must reduce the weight and size of the AR/MR devices while improving their capabilities and bringing down their cost. The original smartphone would not have led to a smartphone revolution if it was too heavy or too bulky to hold comfortably with one hand. Meanwhile, current AR/MR headsets are bulky and heavy, making them inconvenient to carry and uncomfortable to wear for extended periods.

Optical components are the engine of AR/MR devices and also contribute significantly to their weight and volume. For example, the Microsoft Hololens 2 uses 8 cameras: 4 for head tracking, 2 for eye tracking, 1 for depth sensing, and 1 RGB camera for capturing what the wearer sees. The holographic display module also consists of bulky optical elements. Reducing the weight and form factor of these optical components is crucial for pushing AR/MR devices toward broader adoption. However, the size and weight reduction cannot sacrifice the performance, as high-resolution imaging with sufficient field of view (FOV) is crucial for a functional and immersive AR/MR system.

This disclosure provides for metasurfaces for use in AR/MR devices as they offer a novel platform for implementing optical components and systems with remarkably reduced size, weight, and cost. Metasurfaces are nanostructured planar surfaces. The nanostructures capture and re-emit (scatter) the incident light, allowing precise control of an incident wave's characteristics such as phase, polarization, and amplitude distributions. FIG. 1A illustrates a metasurface 1 and incident light 2 impinging on nanostructures 4 of the metasurface 1. FIG. 1A shows re-emitted light 6 emerging from the metasurface 1 having precisely controlled characteristics. The planar form factor of metasurfaces allow for relatively simple fabrication and low-cost production.

Figure 1B:
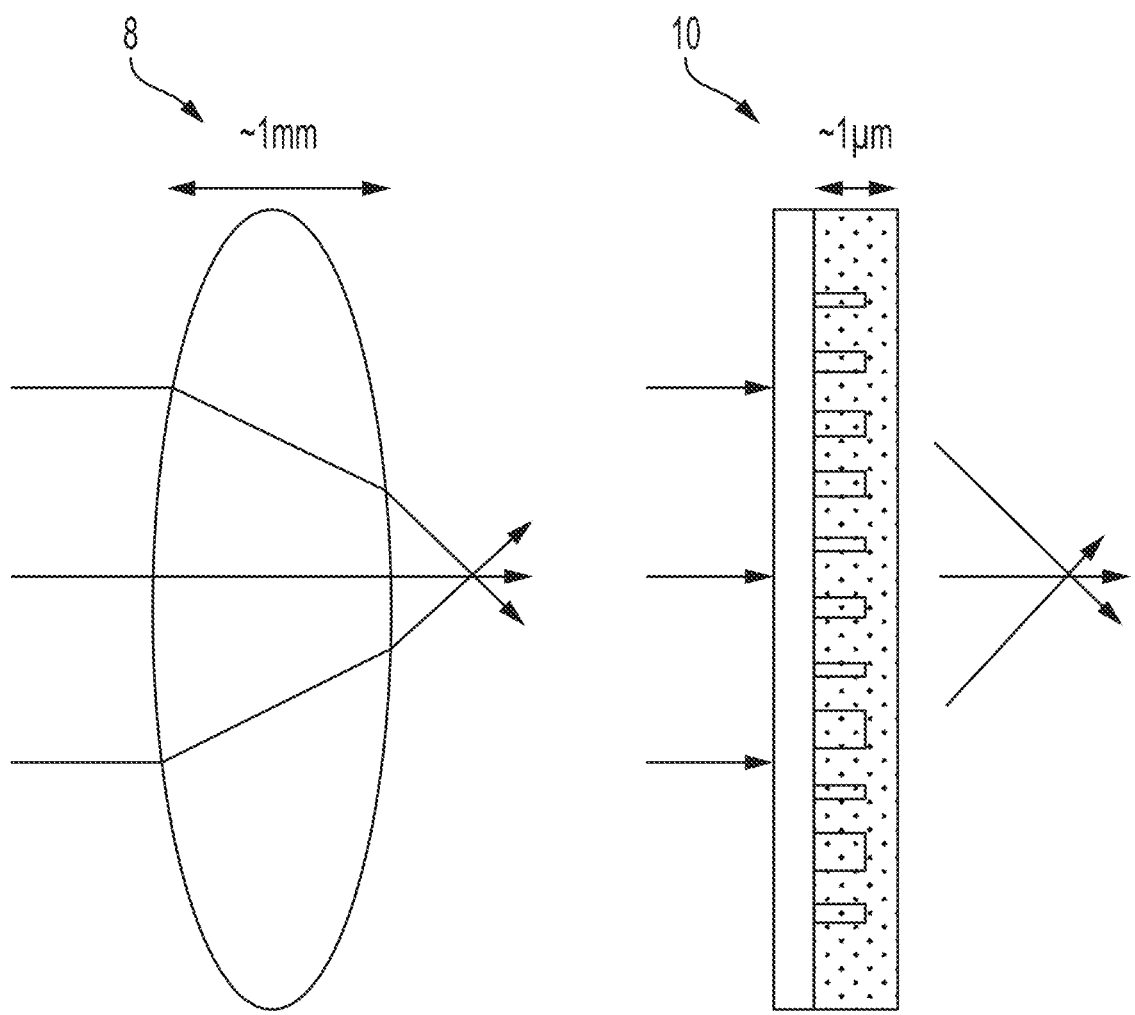
FIG. 1B shows a comparison of a traditional lens and a metalens, in accordance with various embodiments.

Metalenses are flat lenses made with optical metasurfaces. FIG. 1B shows a comparison of a traditional lens and a metalens. FIG. 1B shows a traditional lens 8 having a thickness. The traditional lens 8 may have a thickness of 1 mm, for example. FIG. 1B also shows a metalens 10. The metalens may have a thickness of 1 nanometer, for example. This figure illustrates the potential of a metalens to drastically reduce the thickness and weight of imaging systems, which can solve the outstanding challenge of AR/MR devices.

Figure 2A:
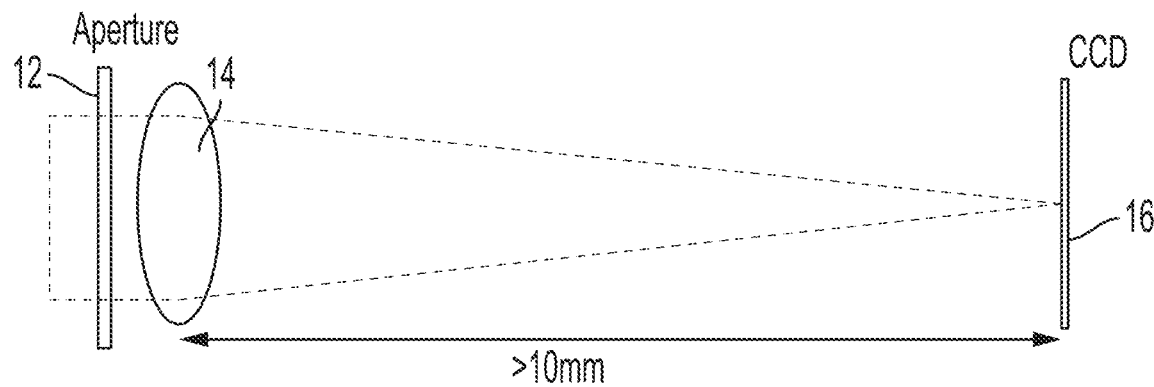
FIG. 2A shows a traditional lens system, in accordance with various embodiments.
Figure 2B:
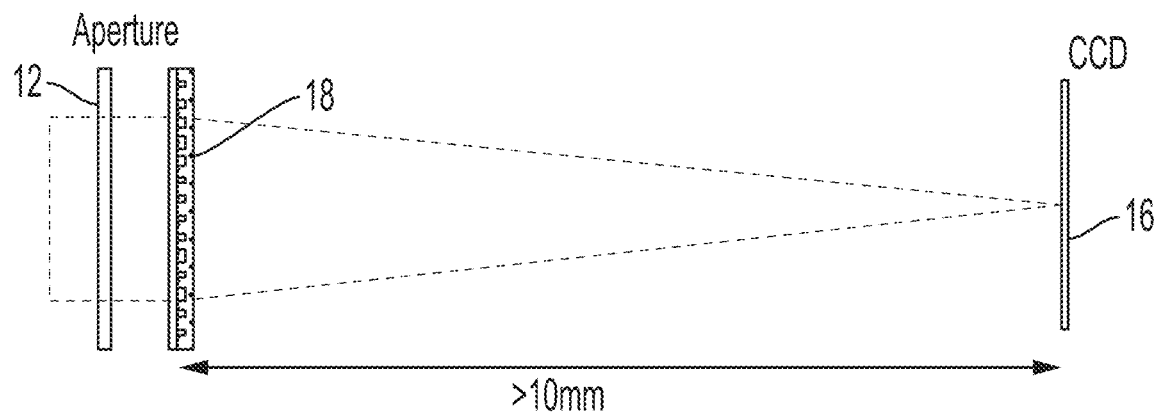
FIG. 2B shows a metalens that replaces the traditional lens of the traditional lens system, in accordance with various embodiments.

However, three challenges remain. The first is that existing computational tools for modeling metasurfaces cannot accurately describe the dependence on the incident angles, which is crucial for cameras to have high efficiency within the FOV. The second challenge is that even after shrinking the thickness of the lens, there remains an ample amount of space between the metalens and the sensing device (CCD or CMOS sensors), so the total footprint of the imaging system is not reduced, as schematically illustrated in FIG. 2A and FIG. 2B. FIG. 2A shows a traditional lens system. Light enters an aperture 12, passes through a traditional lens 14 and focuses on a sensing device 16. FIG. 2B shows a metalens 18 that replaces the traditional lens 14 (FIG. 2A). Light enters an aperture 12, passes through a metalens 18, and focuses on a sensing device 16. Notably, the most significant contributor to the relative size of both configurations is the distance between the lens and the sensing device that is needed to facilitate proper focusing of the light.

The third challenge is that a practical imaging system for AR/MR devices must be produced at large scale and low cost, which precludes the use of electron-beam lithography commonly used in the metasurface community and requires using larger feature sizes and spacings in the design.

To address the first challenge a new algorithm is developed, as are computational tools that accurately and efficiently model 3D metasurfaces for all of the incident angles of interest. This disclosure also addresses the second and third challenges, inventing multilayer metasurface systems that compress lenses and free space into an ultra-compact imaging system in an integrated fashion, inverse-designing metasurfaces that can be fabricated at high throughput in commercial foundries, and experimentally realizing such an ultra-compact imaging system.

The discussion now shifts to aspects of integrating lenses and free space with multilayer metasurfaces. With a single-lens design, the majority of the space is occupied by the free space to provide propagation from the lens to the focal plane, as illustrated in FIGS. 2A-B. Metalenses can reduce the thickness of the lens, but the amount of free space required remains the same, as illustrated in FIG. 2B, so the overall footprint of the imaging system remains largely unchanged.

However, in various embodiments, translationally invariant structures (which preserve the transverse momentum) may be used to "squeeze" the free space to a smaller thickness while maintain the dispersion relation of free space. However, such designs often face constraints, working over very small angular ranges, resulting in very limited FOV. The use of translationally invariant structures may also limit the design degrees of freedom. Furthermore, such designs still separate the lens and the (squeezed) free space, which is not optimal.

Figures 2C, 2D:
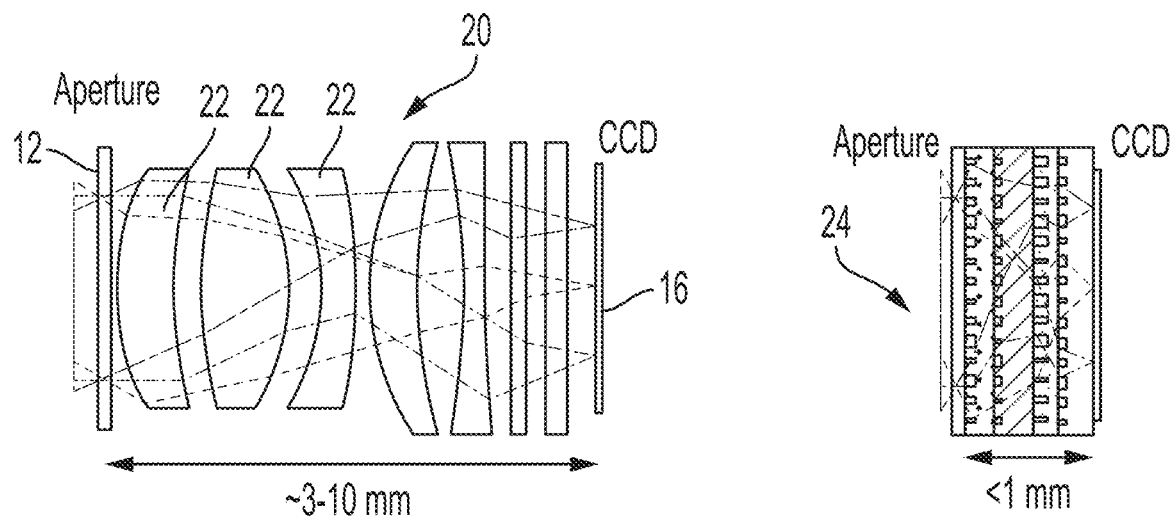
FIG. 2C illustrates a multi-lens design, in accordance with various embodiments.
FIG. 2D schematically illustrates a multilayer metasurface system that replaces both conventional lenses and free space of a traditional lens system in an integrated fashion, such that there is no longer a lens region and a translationally invariant free-space region, in accordance with various embodiments.

FIG. 2C illustrates a multi-lens design. This design includes an aperture 12 and sensing device 16 with a set 20 of multiple lenses 22 spaced between the aperture 12 and sensing device 16. This configuration utilizes the space available without separating into a lens region and a free-space region. This multi-lens approach successfully shrinks the device thickness while reducing chromatic and off-axis aberrations, but the lens elements are conventional lenses that are bulky and heavy.

Finally, with reference to FIG. 2D, a multilayer metasurface system 24 is schematically illustrated that replaces both the conventional lenses and the free space in an integrated fashion, such that there is no longer a lens region and a translationally invariant free-space region. This embodiment realizes a drastic reduction of the total weight and total volume of a wide-FOV imaging system. Structures of this embodiment will be described in greater detail in following paragraphs.

Figure 3:
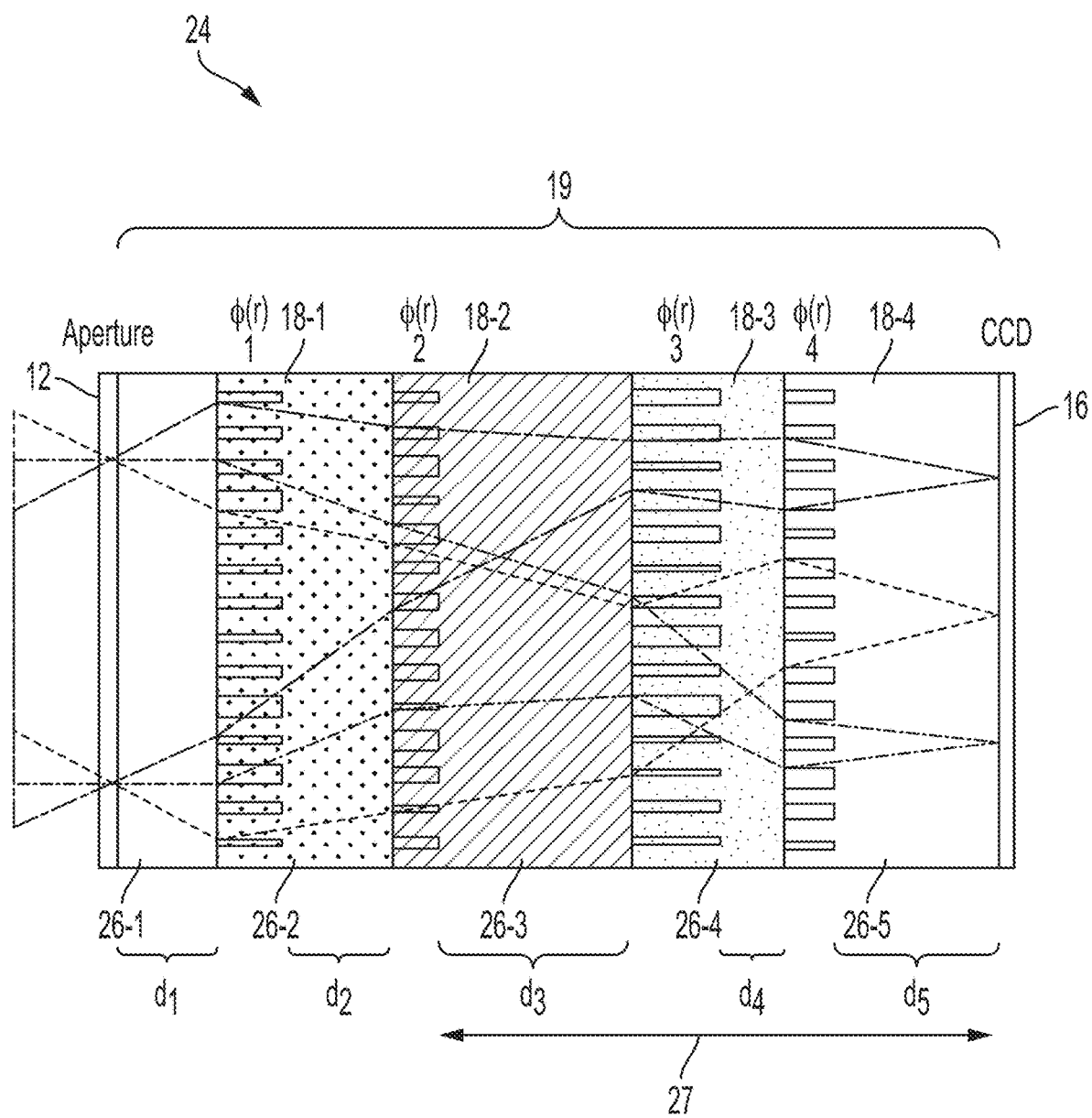
FIG. 3 illustrates a lens system having a cascade of multiple metasurfaces between an aperture and sensing device, in accordance with various embodiments.

A single layer of a thin metasurface can be approximately modeled with a spatially varying phase shift profile $\phi(x, y)$, and light incident at one location exits from the same location on the other side of the metasurface. Clearly, such a single layer metasurface cannot produce the spatial focusing required for an imaging system, which is why free-space propagation is needed in FIG. 2B. However, a cascade of multiple metasurfaces can produce spatial focusing by utilizing the spaces between the layers, as illustrated in FIG. 2D and FIG. 3. The distance between layers and the design of each layer can be jointly optimized to realize a compact optical system that integrates lenses and free spaces. Such designs may be developed through a variety of mathematical modeling techniques. The following discussion will include a simple model that is fast but less accurate, an accurate full-wave modeling solution, and an inverse design that utilizes the developed full-wave models.

FIG. 3 illustrates a lens system 24 having a cascade of multiple metasurfaces 18-1, 18-2, 18-3, and 18-4 between an aperture 12 and sensing device 16. The multiple metasurfaces are spaced from each other, the aperture 12, and/or the sensing device 16, by a cascade of multiple distances 26-1, 26-2, 26-3, 26-4, and 26-5. A first metasurface 18-1, a second metasurface 18-2, a third metasurface 18-3, and a fourth metasurface 18-4 are shown, though any number of metasurfaces may be provided. Light enters through an aperture 12. The first metasurface 18-1 is separated from the aperture 12 by a first distance 26-1. The second metasurface 18-2 is separated from the first metasurface 18-1 by a second distance 26-2. The third metasurface 18-3 is separated from the second metasurface 18-2 by a third distance 26-3. The fourth metasurface 18-4 is separated from the third metasurface 18-3 by a fourth distance 26-4. The sensing device 16 is separated from the fourth metasurface 18-5 by a fifth distance 26-5. A holder 19 may comprise a substrate or adjacent fixture that holds the metasurfaces in fixed spaced apart relation to maintain the various distances.

A cascade of local metasurfaces is of particular importance to the provision of spatial focusing. Stated differently, a key element of the proposed design is the use of multiple metasurface layers with reduced free-space propagation between them. The design may start with a minimal model that captures this key element. Consider N layers of metasurfaces, in between an aperture stop and the sensing device, as schematically shown in FIG. 3. One may begin by modeling the n-th layer as an axisymmetric phase-shift profile, parametrized by a polynomial, $$\phi_n(r) = \Sigma_{k=1}^{K} c_{nk} r^k. \tag{1}$$

Polarization dependence will be ignored for now. Then, the set of polynomial coefficients $\{c_{nk}\}_{n,k}$ and the set of spacing between layers $\{d_n\}_{n=1}^{N+1}$ fully parametrize the multilayer metasurface system.

Consider a list of M incident angles within the FOV of interest, and compute the field profile $E_{out}^{(m)}$ (x, y) on the sensing device for each incident planewave. Given the m-th incident wave vector ($k_x^m$, $k_y^m$), the incident field profile is $E_{in}^{(m)}$ (x, y)=exp [$i(k_x^m x + k_y^m y)$] with field outside the entrance aperture truncated. Free-space propagation between the entrance aperture and the first metasurface layer can be described exactly by angular spectrum propagation: Fourier transforming the truncated field profile from real space (x, y) to momentum space ($k_x$, $k_y$), multiplying by exp [$ik_z d_1$] in momentum space where $k_z = \sqrt{(\omega/c)^2 - k_x^2 - k_y^2}$, and Fourier transforming back to real space. Then, propagation through the first metasurface layer is modeled by multiplying the field profile by exp [$i\phi_n(x, y)$]; non-local coupling within each metasurface layer and reflection is ignored in this basic model. Then, angular spectrum propagation is used again to propagate to the second metasurface layer. This process is repeated for each of the subsequent metasurface layers and free-space layers until we obtain the field profile $E_{out}^{(m)}$ (x, y) at the sensing device. Let ($x_m$, $y_m$) be the target sensing device location for the m-th incident planewave to focus to. Then the main goal of the design is to maximize the intensity $|E_{out}^{(m)}(x_m, y_m)|^2$ for all of the incident angles (for m=1, . . . , M). This requires a minimax optimization, where the figure of merit (FOM) one aims to maximize is the worst-case value $$FOM = \min_m |E_{out}^{(m)}(x_m, y_m)|^2. \quad (2)$$

Another goal of this design is to create an imaging system that is much more compact than existing systems. Therefore, an additional term may be added to the FOM to promote thinner designs $$FOM = \min_m |E_{out}^{(m)}(x_m, y_m)|^2 - \alpha \sum_{n=1}^N d_n, \quad (3)$$

with $\alpha$ being a positive number. For various embodiments, one may consider monochromatic operation.

The minmax optimization problem may be reformulated into an epigraph form so that the problem is differentiable, and then a gradient-based optimization may be performed with the Method of Moving Asymptotes (MMA) algorithm. In various embodiments, an open-source nonlinear optimization library NLopt, may be used. Gradients can be computed with automatic differentiation or forward-mode differentiation.

Once the optimized phase profiles $\{\phi_n(r)\}_n$ and distances $\{d_n\}_n$ are determined, the metasurface structures may be obtained with a unit-cell-based approach. The metasurface is divided into subwavelength unit cells, and each unit cell (a meta-atom) is simulated individually with a periodic boundary condition. A library of meta-atoms can then be built and the method may pick the meta-atom to use at each unit cell based on the desired phase shift $\phi_n(x, y)$ there.

The model just discussed above may capture the essential physics and allows for fast design and optimization, but it does not capture non-local coupling effects which are significant for large incident angles and for large-FOV cameras. It also ignores reflection, which becomes more important as more layers are used. In the subsequent paragraphs, the discussion includes full-wave metasurface modeling with nonlocal effects. The model captures efficient methods that can accurately model the transport of large-angle light through multilayer metasurfaces.

To describe nonlocal coupling effects, one may adopt a rigorous formalism. One can write the incoming wavefront as a superposition of different propagating plane waves, as $$E_{in}(\rho;\omega) = \int E_{in}(k_{\|};\omega) e^{ik_{\|}\cdot\rho} dk_{\|}, \quad (4)$$

and the coefficients $E_{in}(k_{\|}; \omega)$ over the different $k_{\|}$ and the two polarization components can be enumerated in a column vector $[\alpha_1, \ldots, \alpha_M]^T$; similarly, the transmitted wavefront can be written as a column vector $[\beta_1, \ldots, \beta_M]^T$. For any linear system, the input vector and the output vector must be related through a linear transformation. Such a linear transformation can be written as a "transmission matrix" $t(k_{\|}, k'_{\|}; \omega)$, such that $$E_t(k_{\|};\omega) = \int t(k_{\|}, k'_{\|};\omega) E_{in}(k'_{\|};\omega) dk'_{\|}. \quad (5)$$

Such a transmission matrix is exact (no approximation involved) and fully captures nonlocal effects and spatial dependences.

In various embodiments, a new algorithm is introduced to compute such transmission matrix efficiently, obtaining the exact output for all of the incident angles of interest simultaneously. But doing such computation directly for a mm-scale or cm-scale metasurface in 3D would require too much memory and computing time, so various embodiments break down the computation into smaller segments. The "overlapping domain approximation" can be used to break down the computation into smaller segments, but some embodiments only consider one single incident angle, rather than the full transmission matrix that is necessary for large-FOV cameras. The subsequent paragraphs describe how to compute the full transmission matrix and account for non-local coupling effects while breaking down the computation into smaller segments.

Figure 4A:
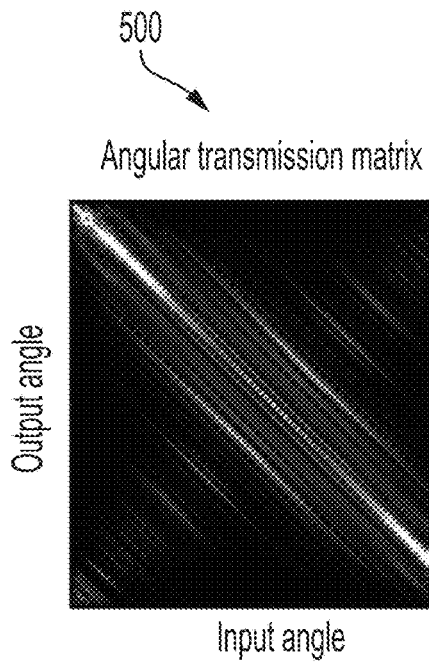
FIG. 4A shows an angular transmission matrix, in accordance with various embodiments.
Figure 4B:
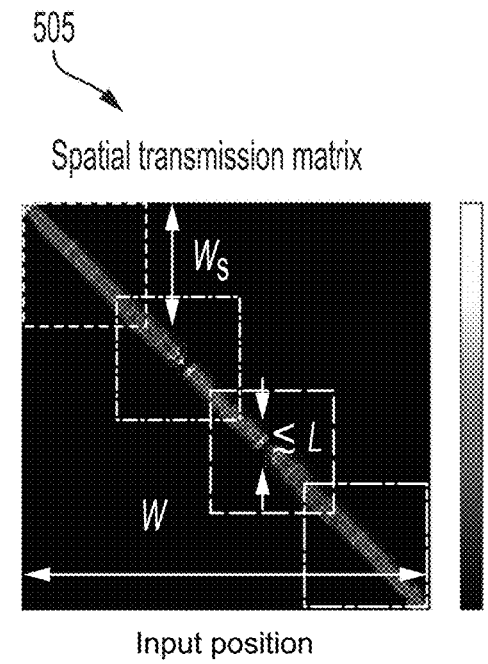
FIG. 4B shows a spatial transmission matrix, in accordance with various embodiments.
Figure 4C:
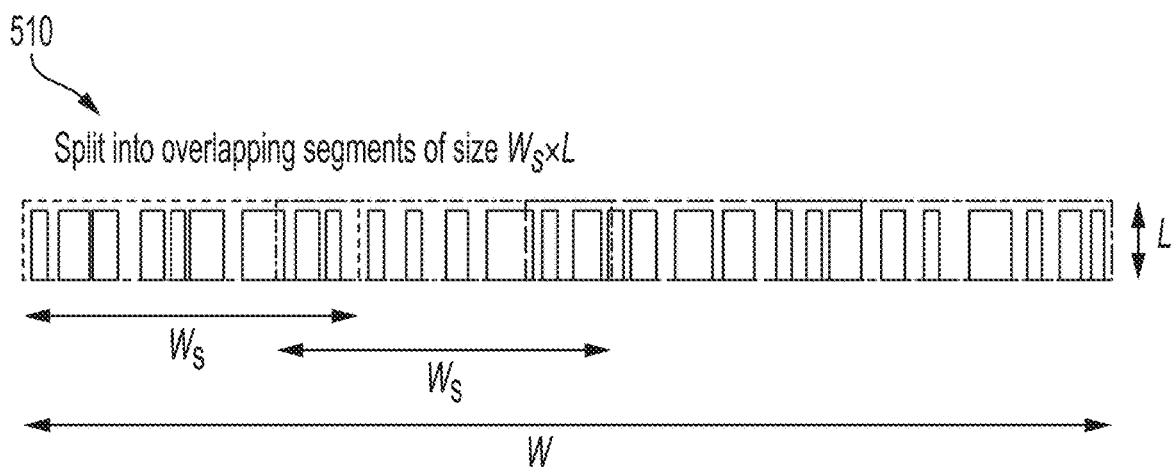
FIG. 4C shows a banded property of the transmission matrix in spatial basis which can be used to break up the computation into smaller overlapping segments and then stitched back together, in accordance with various embodiments.

The key is to do a Fourier transform of the transmission matrix from momentum basis to spatial basis, as illustrated in FIG. 4. FIG. 4 shows an angular transmission matrix 500, a spatial transmission matrix 505, and a banded property of the transmission matrix in spatial basis which can be used to break up the computation into smaller segments 510. Fourier transform is a unitary operation, so the information carried is identical in either basis. The off-diagonal elements of the transmission matrix in spatial basis describe nonlocal coupling effects; the conventional model of local metasurfaces ignore those elements.

The transmission matrix in spatial basis is concentrated near the diagonal, with a diagonal width being smaller than the thickness L of the metasurface, as illustrated in spatial transmission matrix 505. This has an intuitive geometric explanation: when one illuminates one spot of the metasurface, the transmitted light emerging from the other side will spread over a width that is no greater than approximately the thickness L.

This banded property of the transmission matrix in spatial basis can be used to break up the computation into smaller segments 510. The spatial transmission matrix of each segment can be computed by simulating that segment with some overlap with neighbors to account for spatial coupling across segments. The spatial transmission matrices of the segments can then be stitched together to form the full transmission matrix. Once the full spatial transmission matrix is assembled, one may Fourier transform back to angular basis, yielding the entire transmission matrix.

The width $W_s$ of these segments can be chosen to be slightly larger than the maximal diagonal width of the spatial transmission matrix, e.g., $W_c \approx 5L$, to ensure accurate reconstruction, but it will be much smaller than the width (i.e. diameter) W of the metasurface. Doing so reduces memory usage to easily manageable levels, even in 3D. The total computation time to build the transmission matrix of the entire large-area metasurface is also reduced to O(W) in 2D and O($W^2$) in 3D.

Figure 5A:
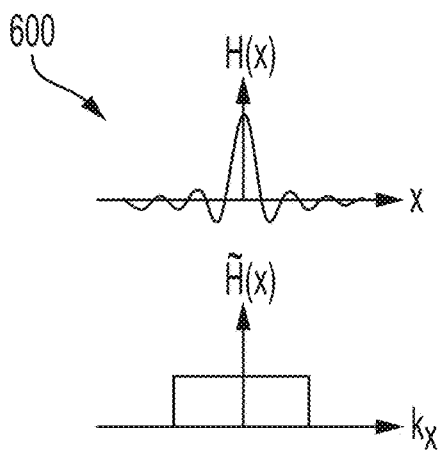
FIG. 5A shows an illustration of incoming wavevectors band limited to those of propagating waves, so in the spatial basis, there are illuminations with a sinc profile, in accordance with various embodiments.
Figure 5B:
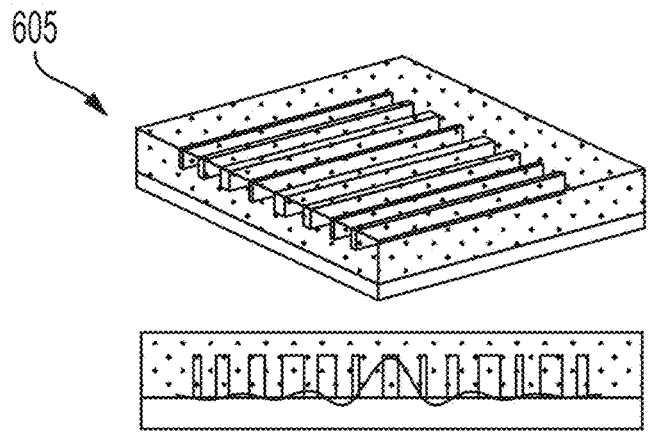
FIG. 5B shows an illustration where each column of the spatial transmission matrix is the response given a sinc illumination, in accordance with various embodiments.
Figure 5C:
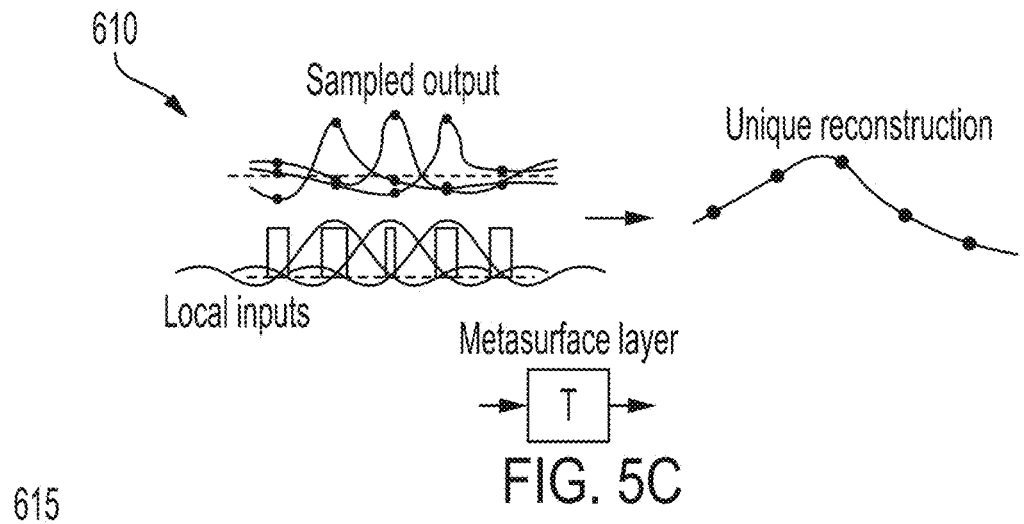
FIG. 5C includes an illustration of illuminations with other profiles obtained through superposition, in accordance with various embodiments.
Figure 5D:
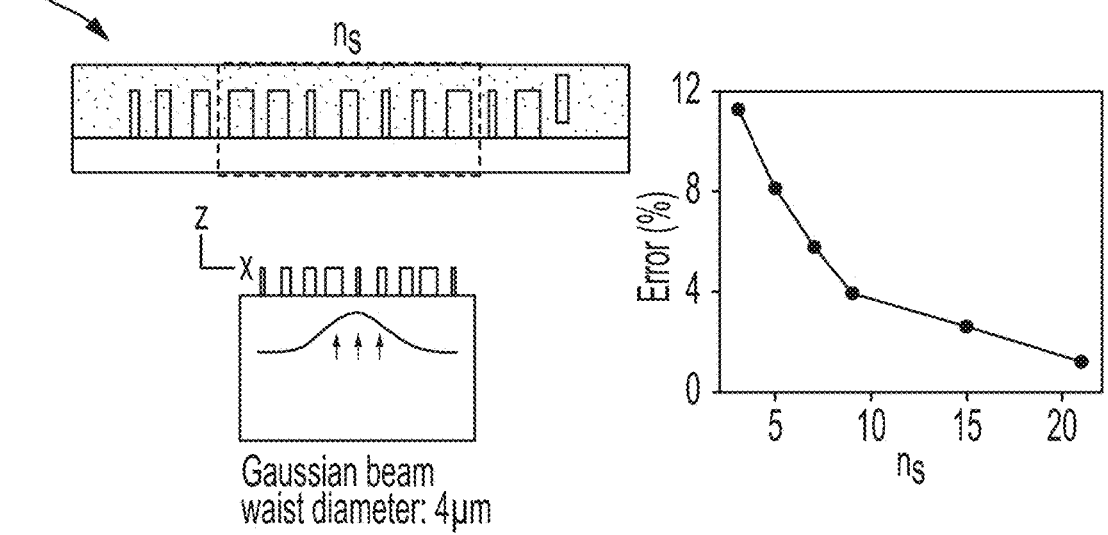
FIG. 5D includes an illustration that shows the truncation error when the DSIR is computed with truncated segments, in accordance with various embodiments.

The transmission matrix in spatial basis has been introduced as the "discrete space impulse response" (DSIR). The incoming wavevectors are band limited to those of propagating waves, so in the spatial basis, there are illuminations with a sinc profile 600, as illustrated in FIG. 5A. FIG. 5B shows an illustration 605 where each column of the spatial transmission matrix is therefore the response given a sinc illumination. FIG. 5C includes an illustration 610 of illuminations with other profiles obtained through superposition. FIG. 5D includes an illustration 615 that shows the truncation error when the DSIR is computed with truncated segments.

The DSIR has several limitations. First, it requires one separate computation for each sinc illumination input, which is slow. Second, it was restricted to 2D scalar waves. Third, it was only developed for single-layer metasurfaces where the modeling of reflection is not necessary. Fourth, it does not provide a rationale design strategy using DSIR, and the traditional meta-atom-based approach is infeasible because building a library of structures containing many unit cells requires a very large library that includes the exponentially-large number of permutations of meta-atoms.

Figure 6:
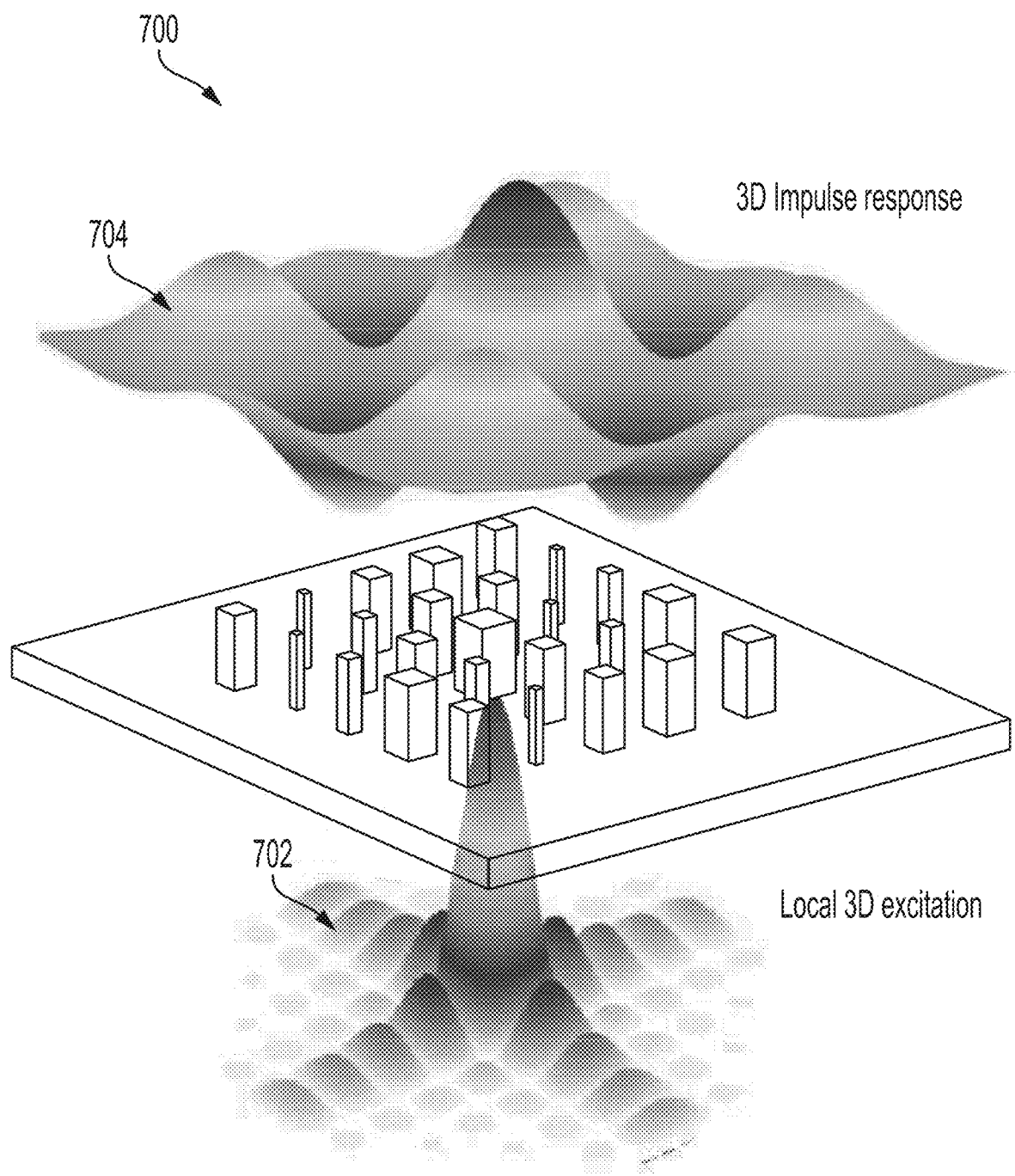
FIG. 6 provides an illustration of aspects of the invention wherein a 3D local excitation is used to characterize the local response (one column of the spatial transmission matrix), computed within a truncated segment for each polarization, in accordance with various embodiments.

In various embodiments, the system will (1) apply a multi-input algorithm to simultaneously simulate all inputs and provide great speed-up, (2) generalize the DSIR formalism to 3D vectorial waves accounting for both polarizations and 3D angles, (3) develop full-wave modeling of multilayer metasurfaces accounting for reflection, and (4) develop a rationale inverse-design strategy. FIG. 6 provides an illustration 700 of aspects of the invention wherein a 3D local excitation 702 is used to characterize the local response 704 (one column of the spatial transmission matrix), computed within a truncated segment for each polarization.

Figure 7A:
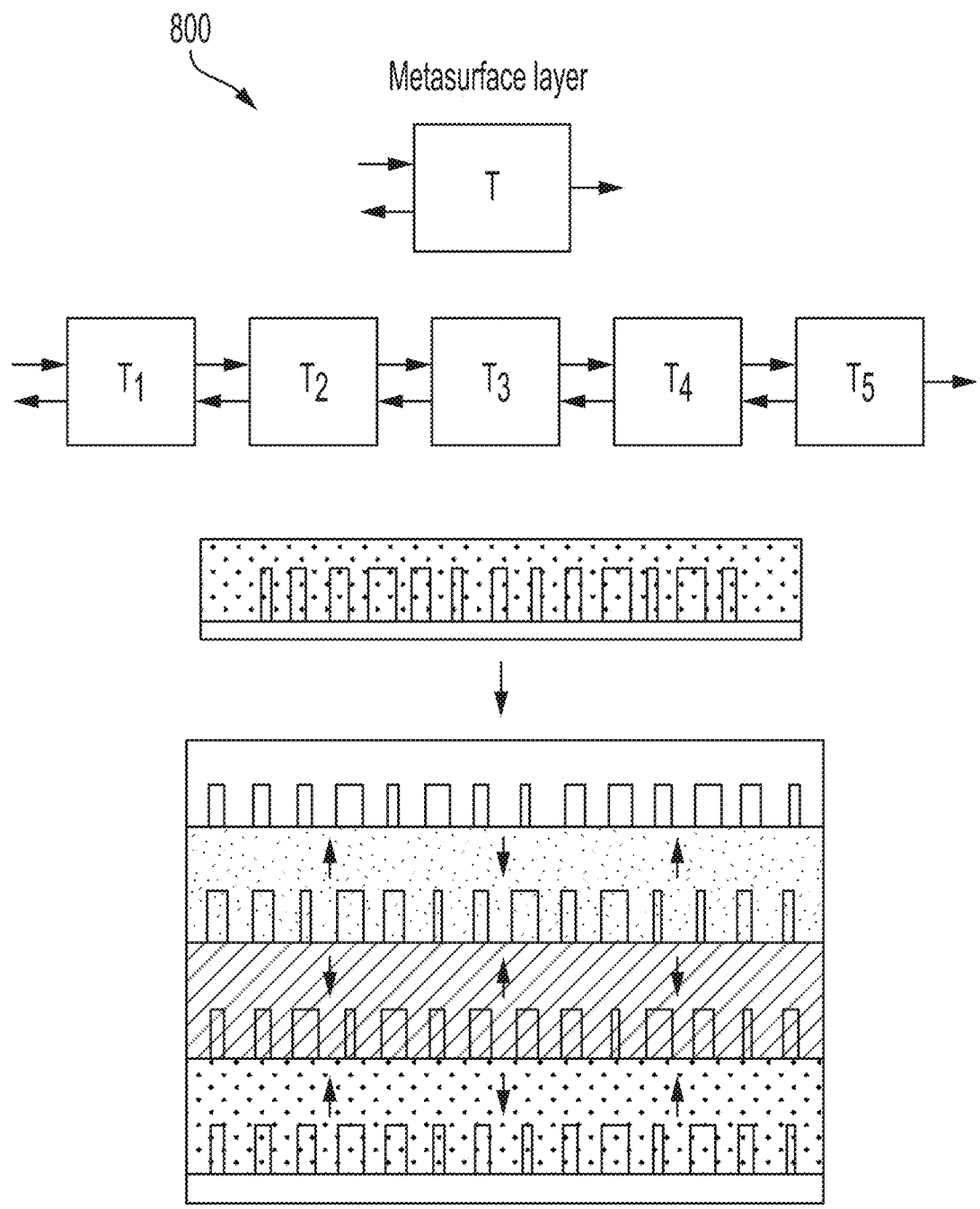
FIG. 7A provides an illustration of multilayer metasurfaces and associated reflections and transmissions, in accordance with various embodiments.
Figure 7B:
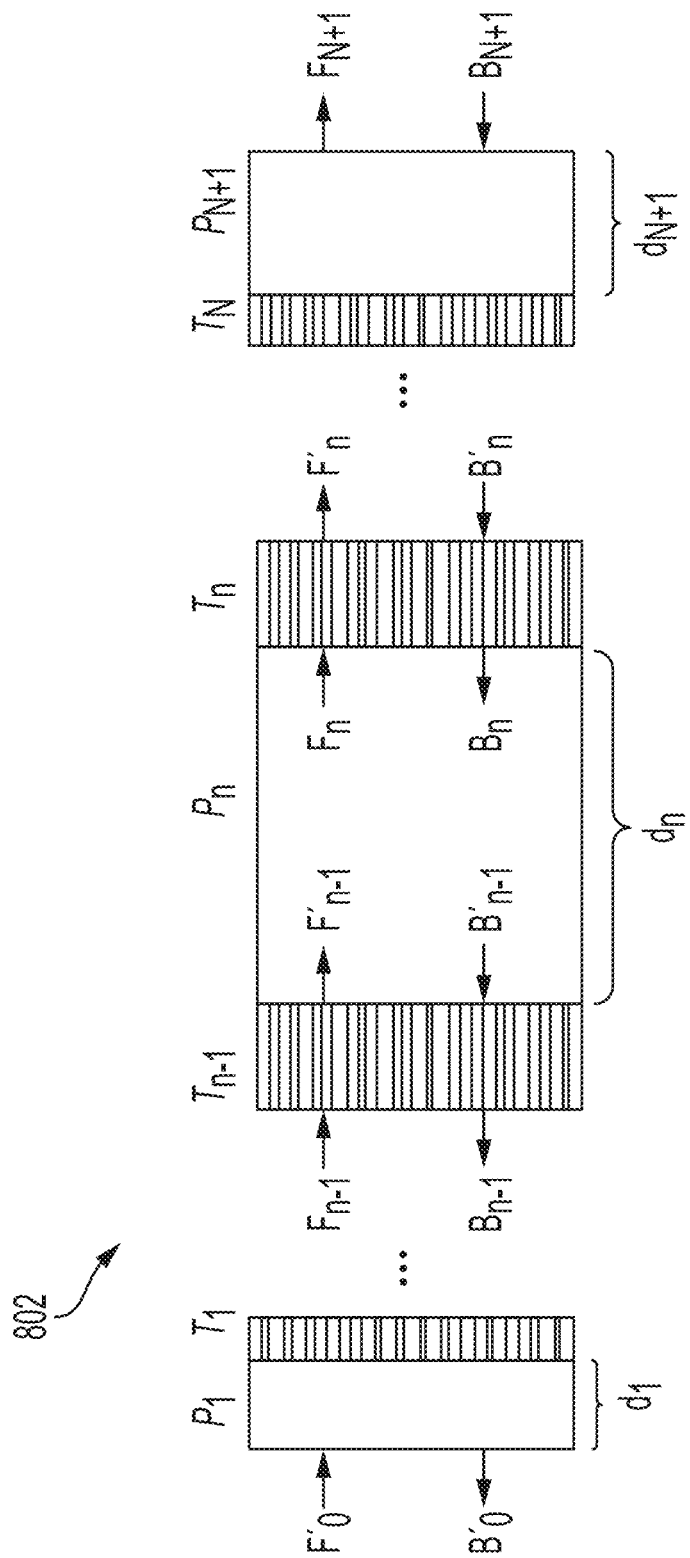
FIG. 7B illustrates a schematic illustration of transfer matrices, in accordance with various embodiments.

Turning now to a discussion of multilayer non-local metasurfaces, in a multilayer system as in FIG. 2D, there is reflection between the layers that must be accounted for. FIG. 7A provides an illustration 800 of multilayer metasurfaces and associated reflections. FIG. 7B illustrates a schematic illustration of transfer matrices 802. With the method herein, one may compute the transmission matrix $t_n$ and reflection matrix $r_n$ in angular basis with incidence from left, as well as matrices $t'_n$ and $r'_n$ with incidence from right, for each of the metasurface layers (n=1, . . . , N). From these, one can construct the transfer matrix $T_n$ of each metasurface layer $$T_n = \begin{bmatrix} t_n - r'_n t'^{-1}_n r_n & r'_n t'^{-1}_n \\ -t'^{-1}_n r_n & t'^{-1}_n \end{bmatrix}, \quad (6)$$

which connects the forward and backward fields on the left of the metasurface $$\begin{bmatrix} F_n \\ B_n \end{bmatrix}$$

to those on the right of the metasurface, as $$\begin{bmatrix} F'_n \\ B'_n \end{bmatrix} = T_n \begin{bmatrix} F_n \\ B_n \end{bmatrix},$$

illustrated in FIG. 7B. The transfer matrix $P_n$ of the n-th layer of free space can be similarly constructed, as $$P_n = \begin{bmatrix} \text{diag}(e^{ik_z d_n}) & 0 \\ 0 & \text{diag}(e^{-ik_z d_n}) \end{bmatrix}, \quad (7)$$

where $d_n$ is the thickness of the layer and $\{k_z\}$ are the axial component of the wavevector for the list of momentum components, with $$\begin{bmatrix} F_n \\ B_n \end{bmatrix} = P_n \begin{bmatrix} F'_{n-1} \\ B'_{n-1} \end{bmatrix}.$$

The transfer matrix of the entire N-layer system, $T_{total}$, can be obtained by cascading the matrices $$T_{total} = P_{N+1} T_N P_N \ldots T_1 P_1 = \begin{bmatrix} A & B \\ C & D \end{bmatrix}, \quad (8)$$

and the total transmission matrix $t_{total}$ from left to right is given by $$t_{total} = A - BD^{-1}C. \quad (9)$$

This gives the transport through the N-layer stack.

The disclosure now shifts to a discussion of inverse-designing multilayer metasurfaces compatible with multi project wafer (MPW). With the tools developed herein, one can accurately compute the transmission of light through multilayer metasurfaces, across the wide range of incident angles of interest. One can use these tools for an accurate design of the multilayer metasurface imaging systems that integrates lenses and free spaces.

The unit-cell-based design may not capture non-local coupling effects and the reflection between layers. Also, these unit-cell-based designs require unit cells smaller than λ/2, where λ is the wavelength, with minimal feature sizes and spacings much smaller than λ/2. Such feature sizes and spacings are too small for the silicon photonics multi project wafer services currently available in foundries. Therefore, inverse design may be used to come up with designs that fully capture non-local coupling and inter-layer reflection and are also MPW-compatible.

To achieve low loss in the visible and NIR spectrum with a reasonable index contrast, one may use silicon nitride (SiN) as the metasurface, on a silica substrate. Sufficient thickness for the SiN is necessary to provide at least 2π phase shift at the frequencies of interest. One may use the AN800 MPW platform of LIGENTEC, which features 800 nm-thick SiN structures patterned using 193 nm dry DUV lithography, with 200 nm minimal feature size and 300 nm minimal separation.

With the full-wave design, the multilayer imaging system is parametrized by the relative permittivity profiles of each layer $\{\varepsilon_n(x, y)\}_{n=1}^N$ and the set of spacing between layers $\{d_n\}_{n=1}^{N+1}$. The SiN layer thickness (800 nm) and the silica substrate thickness will be fixed.

Here the embodiment will consider a list of M incident angles within the FOV of interest. But here the embodiment may also consider both polarizations for the incident light (p=1,2), and will model the multilayer system much more accurately by computing the vectorial field profile $E_{out}^{(m,p)}$ (x, y) at the sensing device with the fullwave simulations developed above.

Again, let $(x_m, y_m)$ be the target sensing device location for the m-th incident planewave to focus to. Aim to maximize the intensity $|E_{out}^{(m,p)}(x_m, y_m)|^2$ for all of the incident angles for m=1, . . . , M. Similar to before, perform a minimax optimization to maximize the worst-case intensity at the target, but now averaged over the two polarizations. The figure of merit (FOM) to maximize is then $$FOM = \min_m \sum_{p=1}^{2} |E_{out}^{(m,p)}(x_m, y_m)|^2 + \sum_i \alpha_i R_i, \qquad (10)$$

where $\{R_i\}$ are regularizers with $\{\alpha_i\}$ being their strengths. The first regularizer is $R_1 = -\Sigma_n d_n$, same as in Eq. (3), which promotes a smaller overall thickness. Additional regularizers are described below. As before, this minimax optimization problem is reformulated into an epigraph form so that the problem is differentiable, and gradient-based optimization such as the MMA algorithm is used.

To allow the optimization to explore a wide parameter space, one may start by allowing the relative permittivity of each pixel in $\{\varepsilon_n(x, y)\}_{n=1}^{N}$ to vary continuously from that of air and that of SiN. As the optimization proceeds, one may use additional regularizers to promote the relative permittivity of air and of SiN, and gradually increase the regularization strength; this should result in an almost-binary structure. Then, one may use levelsets to parametrize the boundaries between air and SiN, making the permittivity profiles $\{\varepsilon_n(x, y)\}_{n=1}^{N}$ fully binary.

With the levelset parametrization, one can readily compute the feature size, feature spacing, and other properties such as the sharpness of edges and corners. This allows one to add regularizers that impose rules in the process design kit (PDK) such as minimal spacing and minimal feature size. Continued optimization, with a gradually increasing regularization strength, will then result in a PDK-compatible design.

Lastly, one will also make the design fault-tolerant by averaging over structural variations based on the typical accuracy and variation of the MPW process.

Figure 8:
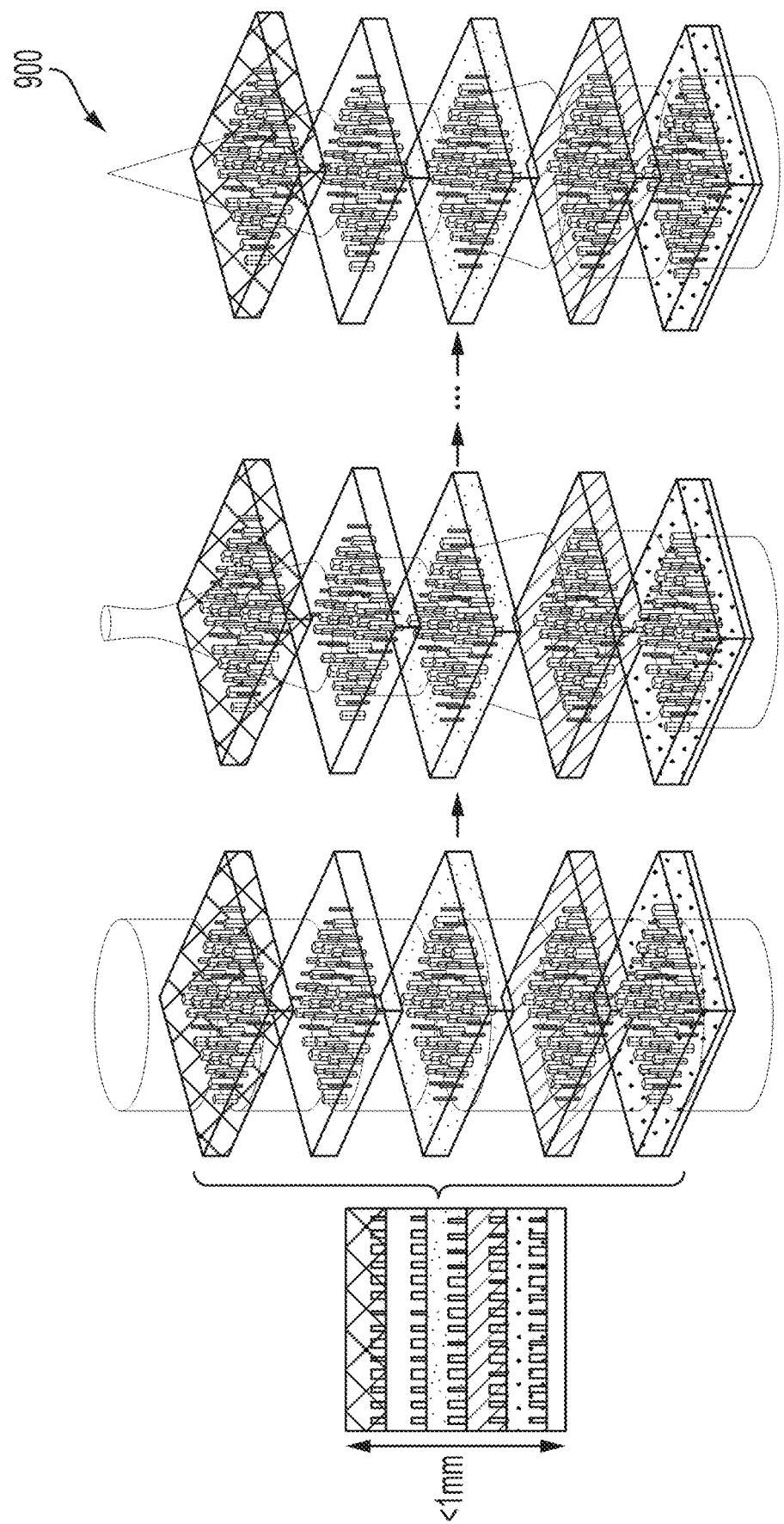
FIG. 8 shows an illustration of the process of optimization where the metasurfaces start from an initial guess with no imaging capability, and the performance improves as the optimization proceeds, in accordance with various embodiments.

FIG. 8 shows an illustration 900 of the process of optimization where the metasurfaces start from an initial guess with no imaging capability, and the performance improves as the optimization proceeds.

After inverse-designing the MPW-compatible multilayer metasurfaces for imaging, the metasurfaces may be fabricated. In various embodiments, the metasurfaces are fabricated with the AN800 MPW platform of LIGENTEC. The taped-out device may be processed to partially remove the lossy silicon handle wafer, creating viewing windows within the apertures of interest. A holder may be fabricated, such as by 3D printing to hold in place the layers of metasurfaces as well as an aperture stop and a CCD sensing device, with the layer spacings being the optimized distances $\{d_n\}_{n=1}^{N+1}$, as illustrated in FIGS. 2D and 3.

A custom goniometer may be built to characterize the incident-angle-dependent focusing property of this ultracompact imaging system. One may scan the incident angle and measure the point spread function. From the measured images, one may obtain the Strehl ratio and the focusing efficiency as a function of the incident angle, as well as the modulation transfer function.

Lastly, one may demonstrate the wide-FOV imaging capability by directly taking pictures using this ultracompact imaging system. Thus the disclosed system may include aspects such as to (1) perform numerical optimization to obtain optimized phase profiles $\{\phi_n(r)\}_n$ and distances $\{d_n\}_n$ for a multilayer metasurface imaging system that integrates lenses and free spaces; (2) develop tools that enable accurate full-wave computation of the polarization-resolved transmission matrices of large-area multilayer metasurfaces using cascaded transfer matrices; (3) perform inverse design to obtain MPW-compatible and fault-tolerant designs of multilayer metasurface imaging systems that integrate lenses and free spaces; and (4) fabricate and characterize the designed imaging system.

Having discussed various embodiments and associated systems, methods, and devices, attention is now directed to a few specific example embodiments of the described system, methods, and devices. Referring to FIGS. 1A-8, but with particular reference to FIG. 3, a lens system 24 may include a first metasurface 18-1 spaced a first distance 26-1 from an aperture 12. The lens system 24 may have a second metasurface 18-2 spaced a second distance 26-2 from the first metasurface 18-1. The first metasurface 18-1 is between the aperture 12 and the second metasurface 18-2. A sensing device 16 is spaced a third distance 27 from the second metasurface 18-2. The first metasurface 18-1 and the second metasurface 18-2 are between the aperture 12 and the sensing device 16. The sensing device 16 may be a CCD array, though other imaging technologies are also contemplated. The aperture 12 may be an aperture of a camera, though other devices are also contemplated. The sensing device 16 may be located to maximize an intensity of incident planewave light for all incident angles of light entering the aperture 12. The positions of the sensing device 16 and metasurfaces can be adjusted for a better imaging performance. The system 24 may also have a metasurface holder 19 located between the aperture 12 and sensing device 16 and holding the first metasurface 18-1 and the second metasurface 18-2 in fixed spatial orientation.

The first metasurface 18-1 and the second metasurface 18-2 may be metasurfaces of a metasurface array containing additional metasurfaces disposed between the aperture 12 and the sensing device 16 in spaced apart relation. For instance, a third metasurface 18-3 and a fourth metasurface 18-4 may be disposed between the aperture 12 and the sensing device 16 in spaced apart relation.

The metasurfaces may have various chemical and mechanical structures. For instance, the metasurfaces may be silicon nitride (SiN). The metasurfaces may have a silica substrate and the silicon nitride may be on the silica substrate. The SiN may be a layer that is at least 800 nm thick. The SiN may be patterned with 200 nm minimal feature size and 300 nm minimal separation.

In various embodiments, lens system 24 has a metasurface array comprising a plurality of spaced apart metasurfaces, such as metasurfaces 18-1, 18-2, 18-3, 18-4. The system 24 has a metasurface holder 19 supporting each metasurface of the plurality of metasurfaces in fixed spaced apart relation and a sensing device 16 spaced away from the metasurface array to receive light from at least one of the plurality of spaced apart metasurfaces. The sensing device 16 is oriented relative to the metasurface array to maximize an intensity of the light emitted in response to incident light for a plurality of incident angles of incident light entering the metasurface array.

Figure 9:
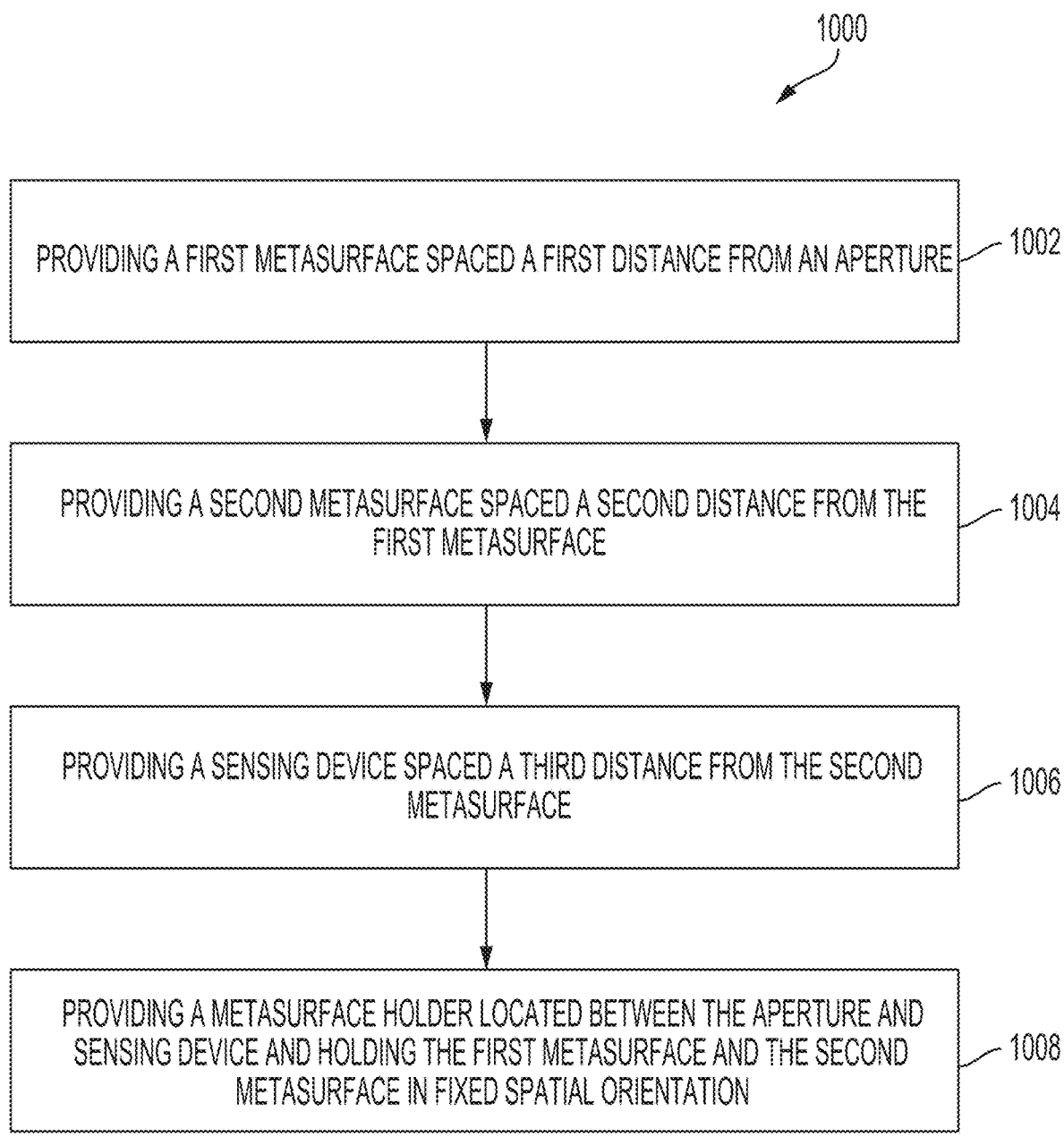
FIG. 9 depicts a method of manufacturing a lens system, in accordance with various embodiments.

Finally, referring to FIG. 9, a method of manufacturing a lens system 1000 is disclosed. The method may include providing a first metasurface spaced a first distance from an aperture (block 1002). The method may include providing a second metasurface spaced a second distance from the first metasurface (block 1004). The first metasurface is between the aperture and the second metasurface. The method may include providing a sensing device spaced a third distance from the second metasurface (block 1006). The first metasurface and the second meta surface are between the aperture and the sensing device. The method may include providing a metasurface holder located between the aperture and sensing device and holding the first metasurface and the second metasurface in fixed spatial orientation (block 1008).

In various embodiments, the first metasurface and the second metasurface are metasurfaces of a metasurface array and the method further comprises providing additional metasurfaces disposed between the aperture and the sensing device in spaced apart relation. The method may include providing a third metasurface and a fourth metasurface disposed between the aperture and the sensing device in spaced apart relation. The method may include locating the sensing device to maximize an intensity of incident planewave light for all incident angles of light entering the aperture. The positions of the sensing device and metasurfaces can be adjusted for a better imaging performance.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

The invention claimed is:

1. A lens system, comprising:
a first metasurface spaced a first distance from an aperture and comprises a silicon nitride (SiN) layer having a thickness of at least 800 nm and a silica substrate where the SiN layer is on the silica substrate;
a second metasurface spaced a second distance from the first metasurface, wherein the first metasurface is between the aperture and the second metasurface; and
a sensing device spaced a third distance from the second metasurface, wherein the first metasurface and the second metasurface are between the aperture and the sensing device.

2. The lens system according to claim 1, wherein the sensing device is a CCD array.

3. The lens system according to claim 1, wherein the aperture is an aperture of a camera.

4. The lens system according to claim 1, wherein the first metasurface and the second metasurface are metasurfaces of a metasurface array containing additional metasurfaces disposed between the aperture and the sensing device in spaced apart relation.

5. The lens system according to claim 1, further comprising a third metasurface and a fourth metasurface disposed between the aperture and the sensing device in spaced apart relation.

6. The lens system according to claim 1, wherein the sensing device is located to maximize an intensity of incident planewave light for all incident angles of light entering the aperture.

7. The lens system according to claim 1, wherein the SiN layer is patterned with 200 nm minimal feature size and 300 nm minimal separation.

8. The lens system of claim 1, further comprising a metasurface holder located between the aperture and sensing device and holding the first metasurface and the second metasurface in fixed spatial orientation.

9. A method of manufacturing a lens system, comprising:
providing a first metasurface spaced a first distance from an aperture, the first metasurface comprises a silicon nitride (SiN) layer having a thickness of at least 800 nm and a silica substrate, the SiN layer being on the silica substrate;
providing a second metasurface spaced a second distance from the first metasurface, wherein the first metasurface is between the aperture and the second metasurface; and
providing a sensing device spaced a third distance from the second metasurface, and
wherein the first metasurface and the second meta surface are between the aperture and the sensing device.

10. The method of manufacturing the lens system according to claim 9, wherein the sensing device is a CCD array.

11. The method of manufacturing the lens system according to claim 9, wherein the aperture is an aperture of a camera.

12. The method of manufacturing the lens system according to claim 9, wherein the first metasurface and the second metasurface are metasurfaces of a metasurface array and the method further comprises providing additional metasurfaces disposed between the aperture and the sensing device in spaced apart relation.

13. The method of manufacturing the lens system according to claim 9, further comprising providing a third metasurface and a fourth metasurface disposed between the aperture and the sensing device in spaced apart relation.

14. The method of manufacturing the lens system according to claim 9, further comprising locating the sensing device to maximize an intensity of incident planewave light for all incident angles of light entering the aperture.

15. The method of manufacturing the lens system according to claim 9, wherein providing the first metasurface comprises forming a layer of silicon nitride on a silica substrate.

16. The method of manufacturing the lens system according to claim 9, further comprising providing metasurface holder located between the aperture and sensing device and holding the first metasurface and the second metasurface in fixed spatial orientation.

17. A lens system, comprising:
a metasurface array comprising a plurality of spaced apart metasurfaces, at least one of the plurality of spaced apart metasurfaces comprises a silicon nitride (SiN) layer having a thickness of at least 800 nm and a silica substrate where the SiN layer is on the silica substrate;
a metasurface holder supporting each metasurface of the plurality of metasurfaces in fixed spaced apart relation; and
a sensing device spaced away from the metasurface array to receive light from at least one of the plurality of spaced apart metasurfaces, wherein the sensing device is oriented relative to the metasurface array to maximize an intensity of the light emitted in response to incident light for a plurality of incident angles of incident light entering the metasurface array.

* * * * *